No. 782,679. Patented February 14, 1905.

UNITED STATES PATENT OFFICE.

GEORG MERLING, OF FRANKFORT-ON-THE-MAIN, AND ROBERT WELDE, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

PSEUDO-CYCLOCITRALIDENE ACETONE AND PROCESS OF MAKING SAME.

SPECIFICATION forming part of Letters Patent No. 782,679, dated February 14, 1905.

Application filed June 6, 1904. Serial No. 211,403. (Specimens.)

*To all whom it may concern:*

Be it known that we, GEORG MERLING, professor of chemistry, residing at Frankfort-on-the-Main, and ROBERT WELDE, chemist, residing at Höchst-on-the-Main, Germany, citizens of the Empire of Germany, have invented certain new and useful Improvements in the Manufacture of Perfumes, of which the following is a specification.

By condensing the ester of isopropylidene-alkyl-acetoacetate with sodium-alkyl-acetoacetate followed by reduction, elimination of water, and hydrolysis trimethyl-cyclohexene-carboxylic acid or a mixture of such acids is obtained, melting at 140° to 142° centigrade under fifteen millimeters pressure. The process is described in United States Patent No. 743,305 and application, Serial No. 151,390, filed April 6, 1903. From this trimethyl-cyclohexenecarboxylic acid or the mixture contained in this acid an aldehyde or mixture of the corresponding aldehydes is obtained by distilling at moderate pressure—for instance, the calcium salt of the acid with the equimolecular proportion of formate of calcium. This aldehyde or mixture of aldehydes, which we call "pseudo-cyclocitral," owing to its close relationship to cyclocitral, is a yellowish oil of the consistency of cyclocitral and having in the cold an odor of carvone and in the heat a stinging smell and boiling at 76° centigrade under twelve millimeters pressure. We have found that this pseudo-cyclocitral when condensed with acetone yields an unsaturated ketone or a mixture of ketones, boiling at 126° to 128° centigrade under twelve millimeters pressure, and which when not diluted has an odor of cedar and when diluted that of violets and tea-roses.

To obtain this perfume, which we will call "pseudo-cyclocitralideneacetone," we proceed, for instance, as follows: One part, by weight, of pseudo-cyclocitral is dissolved in three parts, by weight, of acetone, a solution of 0.05 part, by weight, of sodium in one part, by weight, of alcohol being added, and the whole is allowed to stand for two hours in ice-water and then for several hours at ordinary temperature. The brownish solution is then diluted with water, neutralized or acidified with an acid, preferably tartaric acid, and distilled with steam. After the excess of acetone is expelled uncondensed pseudo-cyclocitral and pseudo-cyclocitralideneacetone pass over with the steam as colorless oil, which is separated from the distillate by shaking it with ether. The ethereal solution is dried with dehydrated sodium sulfate, and the oil remaining after distilling the ether is separated by fractional distillation in a vacuum into pseudo-cyclocitral and pseudo-cyclocitralideneacetone.

Pseudo-cyclocitralideneacetone is also obtained if pseudo-cyclocitral is heated with acetone to a high temperature in a closed tube in the absence of condensing agents. Pseudo-cyclocitral condenses in a similar manner also with other ketones and their derivatives.

Thus an oily condensation product is obtained if under the same conditions as with acetone pseudo-cyclocitral is condensed with ethyl-methylketone. It boils at 133° to 135° centigrade under eight millimeters pressure.

It was not to be foreseen that pseudo-cyclocitralideneacetone and its homologues are valuable perfumes, the more so as we have shown that the hydrogenized cyclic aldehydes, among which also those chemically related to pseudo-cyclocitral obtained according to United States Patent No. 714,931 and German Patent No. 142,139, generally do not yield perfumes when condensed with acetone.

Having now described our invention, what we claim is—

1. The herein-described process of making perfumes, which consists in condensing a mixture of aldehydes, obtained from the herein-described trimethyl-cyclohexene carboxylic acid with acetone and its homologues.

2. As new products the pseudo-cyclocitralideneacetone and its homologues, being colorless oils, soluble in alcohol, ether, benzene and ligroin and having the odor of violets and tea-roses.

3. As a new product the pseudo-cyclocitralideneacetone, being a colorless oil, soluble in alcohol, ether, benzene and ligroin, boiling at 133° to 135° centigrade under eight millimeters pressure and having the odor of violets.

In testimony that we claim the foregoing as our invention we have signed our names in presence of two subscribing witnesses.

GEORG MERLING.
    ROBERT WELDE.

Witnesses:
 ALFRED BRISBOIS,
 JOSEPH FLACH.